United States Patent
Ueda et al.

(10) Patent No.: US 6,626,058 B2
(45) Date of Patent: Sep. 30, 2003

(54) C-AXIS DRIVING SYSTEM FOR MACHINE TOOLS

(75) Inventors: Toshio Ueda, Yamatokoriyama (JP); Yoshitane Uemura, Yamatokoriyama (JP); Nobuaki Sasabe, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 23 days.

(21) Appl. No.: 09/866,561

(22) Filed: May 29, 2001

(65) Prior Publication Data

US 2002/0017888 A1 Feb. 14, 2002

(30) Foreign Application Priority Data

May 26, 2000 (JP) .......................................... 2000-156815

(51) Int. Cl.[7] .............................................. B23Q 16/02
(52) U.S. Cl. .............................. 74/396; 74/405; 74/425; 29/48.5 R; 82/142
(58) Field of Search .......................... 74/396, 425, 405; 82/142–147; 29/48.5 R

(56) References Cited

U.S. PATENT DOCUMENTS 4,621,405 A  11/1986  Cook et al.

FOREIGN PATENT DOCUMENTS

| DD | 241 704 A | | 12/1986 |
|---|---|---|---|
| DE | 43 05 810 | * | 3/1994 |
| JP | 59-53140 A | | 3/1984 |
| JP | 59-175906 | * | 10/1984 |
| JP | 63-191549 | * | 8/1988 |
| JP | 1-114257 A | | 8/1989 |
| JP | 7-96441 | * | 4/1995 |
| JP | 7-164071 | * | 6/1995 |

* cited by examiner

*Primary Examiner*—William C Joyce
(74) *Attorney, Agent, or Firm*—Smith Patent Office

(57) ABSTRACT

A C-axis driving system for machine tools is disclosed that comprises a worm wheel mounted on a spindle that is rotatably supported by a headstock. The C-axis driving system also includes a worm shaft with a worm formed therein directed perpendicular to an axis of the spindle and placed so as to be pivotable about a pivotal shaft between an engagement position, and a disengagement position. The C-axis driving system also includes a C-axis driving motor connected to the worm shaft and serving to rotationally index the spindle to a specified rotational angle. The pivotal shaft is provided on the worm shaft base so as to be directed perpendicular to an axis of the worm shaft. Thus, the C-axis driving system for machine tools is capable of reducing the size of the C-axis unit as well as the cost while allowing a smooth engagement with the worm wheel.

1 Claim, 10 Drawing Sheets

C-AXIS DRIVING SYSTEM FOR MACHINE TOOLS

BACKGROUND OF THE INVENTION

1. Field of the Invention

The present invention relates to a C-axis driving system in a machine tool having a spindle rotably supported on a headstock and for rotationally indexing and positioning the spindle to a specified rotational angle.

2. Discussion of the Related Art

For example, some numerically controlled (NC) lathes are equipped with a C-axis driving system which allows C-axis machining by a rotating tool to be performed while controlling the rotation of the spindle that is rotationally driven by a spindle driving motor. See, for example, Japanese Patent Publication No. 2566543, Japanese Patent Laid-Open Publication SHO 59-53140 and Japanese Utility Model Laid-open Publication HEI 1-114257.

Conventionally, this type of C-axis driving system has been provided in the following structure. As shown in FIG. 10, a worm shaft 82 engageable with a worm wheel 80 fixedly mounted on a spindle (unshown) is placed perpendicular to the axis of the spindle and supported by a unit casing 81. A pivotal shaft 83 generally equal in length to the worm shaft 82 is inserted into the unit casing 81 parallel to the worm shaft 82. The unit casing 81 is driven by a drive mechanism (not shown) so as to rotate about the pivotal shaft 83 between an engagement position for engagement with the worm wheel 80 and a disengagement position for disengagement therefrom. Further, a C-axis driving motor 84 is connected to an end portion of the worm shaft 82 of the unit casing 81.

When it is in the engagement position, the worm shaft 82 is rotatingly driven by the C-axis driving motor 84. Thus the spindle is rotationally indexed and positioned into a specified rotational angle via the worm wheel 80. In this state, milling or other rotating work can be performed. Otherwise for turning work, the worm shaft 82 is moved into the disengagement position.

In this connection, in order to obtain smooth engagement between the worm wheel 80 and the worm shaft 82, the rotational angle of the unit casing 81 is preferably as small as possible. From the viewpoint of making the rotational angle small, in some cases the center distance "d" between the worm shaft 82 and the pivotal shaft 83 is set to a large distance.

However, when the center distance "d" between the worm shaft and the pivotal shaft is set to a large distance as in the conventional systems, the entire C-axis unit increases in size thereby causing the structure to be complicated and the cost increases.

SUMMARY OF THE INVENTION

The present invention has been made considering the above problems and circumstances in the prior art.

An object of the invention is to provide a C-axis driving system for machine tools that is capable of maintaining a smaller sized C-axis unit as well as maintaining the costs while using a C-axis driving system that implements a smooth engagement with the worm wheel.

In order to achieve this and other objects according to the invention, a C-axis driving system for machine tools is provided that includes a worm wheel mounted on a spindle rotatably supported by a headstock. The C-axis driving system also includes a worm shaft with a worm formed therein that is directed perpendicular to an axis of the spindle and is provided so as to be pivotable about a pivotal shaft between an engagement position, where the worm shaft is engaged with the worm wheel and a disengagement position, where the worm shaft is disengaged therefrom. The C-axis driving system also includes a C-axis driving motor connected to the worm shaft that serves to rotationally index the spindle to a specified rotational angle. A worm shaft base rotatably supports the worm shaft. The pivotal shaft is provided on the worm shaft base so as to be directed perpendicular to an axis of the worm shaft and the pivotal shaft is supported by the headstock.

According to another aspect of the invention, in the C-axis driving system as described above, the C-axis driving motor is connected in series to an end portion of the worm shaft of the worm shaft base. Also the pivotal shaft is placed in proximity to the C-axis driving motor between the worm of the worm shaft and the C-axis driving motor.

With the C-axis driving system of the invention, the worm shaft is supported by the worm shaft base, while the pivotal shaft is placed on the worm shaft base so as to be directed perpendicular to the axis of the worm shaft. Therefore, the worm shaft base can be of a size that allows the worm shaft to be housed therein and supported, thus allowing the unit to be smaller in size when compared to the conventional systems where the worm shaft and the pivotal shaft are placed apart with a distance therebetween. This thereby allows the C-axis unit as a whole to be reduced in size.

Also, since the worm shaft base can be downsized, the structure can be simplified when compared with the conventional unit casing. This also results in reductions in the parts count and the cost.

Furthermore, when placing the pivotal shaft on the worm shaft base so that the rotational angle of the worm shaft base becomes small, a smooth engagement with the worm wheel can be achieved.

According to another aspect of the invention, the C-axis driving motor is connected in series at an end portion of the worm shaft of the worm shaft base. Also the pivotal shaft is provided in proximity to the driving motor between the worm and the C-axis driving motor. Therefore, while a smooth engagement with the worm wheel is ensured, the driving force can be reduced when compared to the conventional case where the whole unit including the C-axis driving motor is pivoted. Thus, the structure can be further simplified and the cost can be further reduced.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Figure 1:
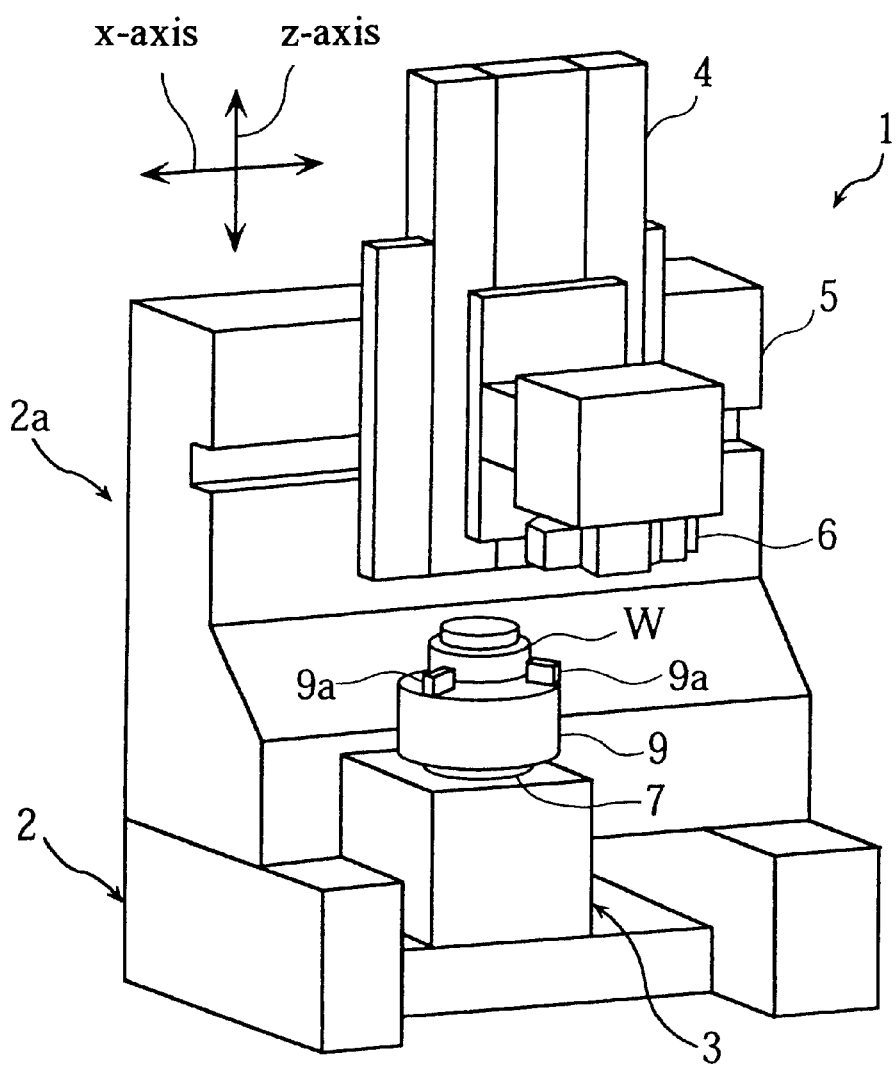
FIG. 1 is a perspective view of a vertical NC lathe having a C-axis driving system according to an embodiment of the present invention.
Figure 2:
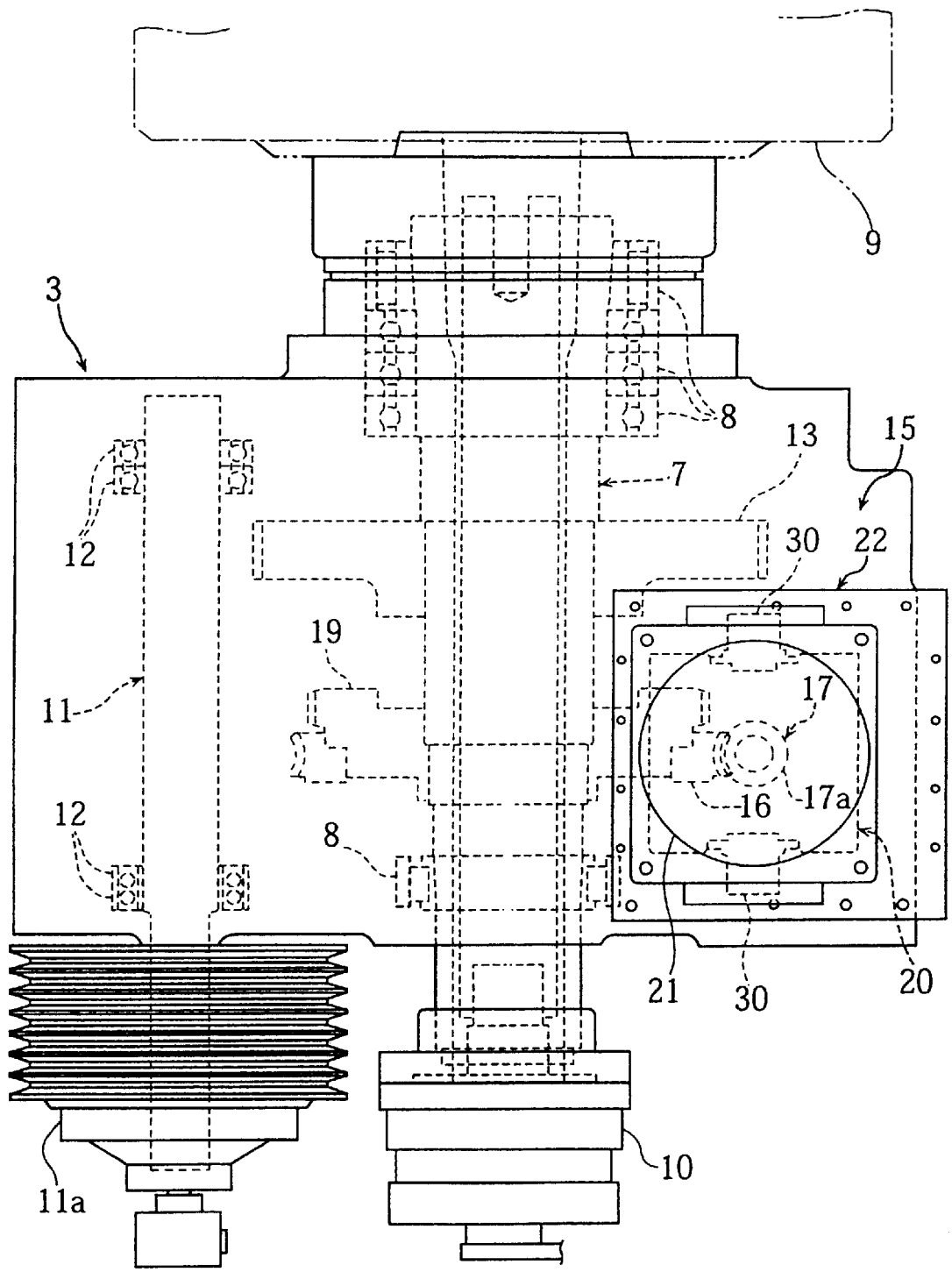
FIG. 2 is a left-hand side view of a headstock provided on the C-axis driving system according to the present invention.
Figure 3:
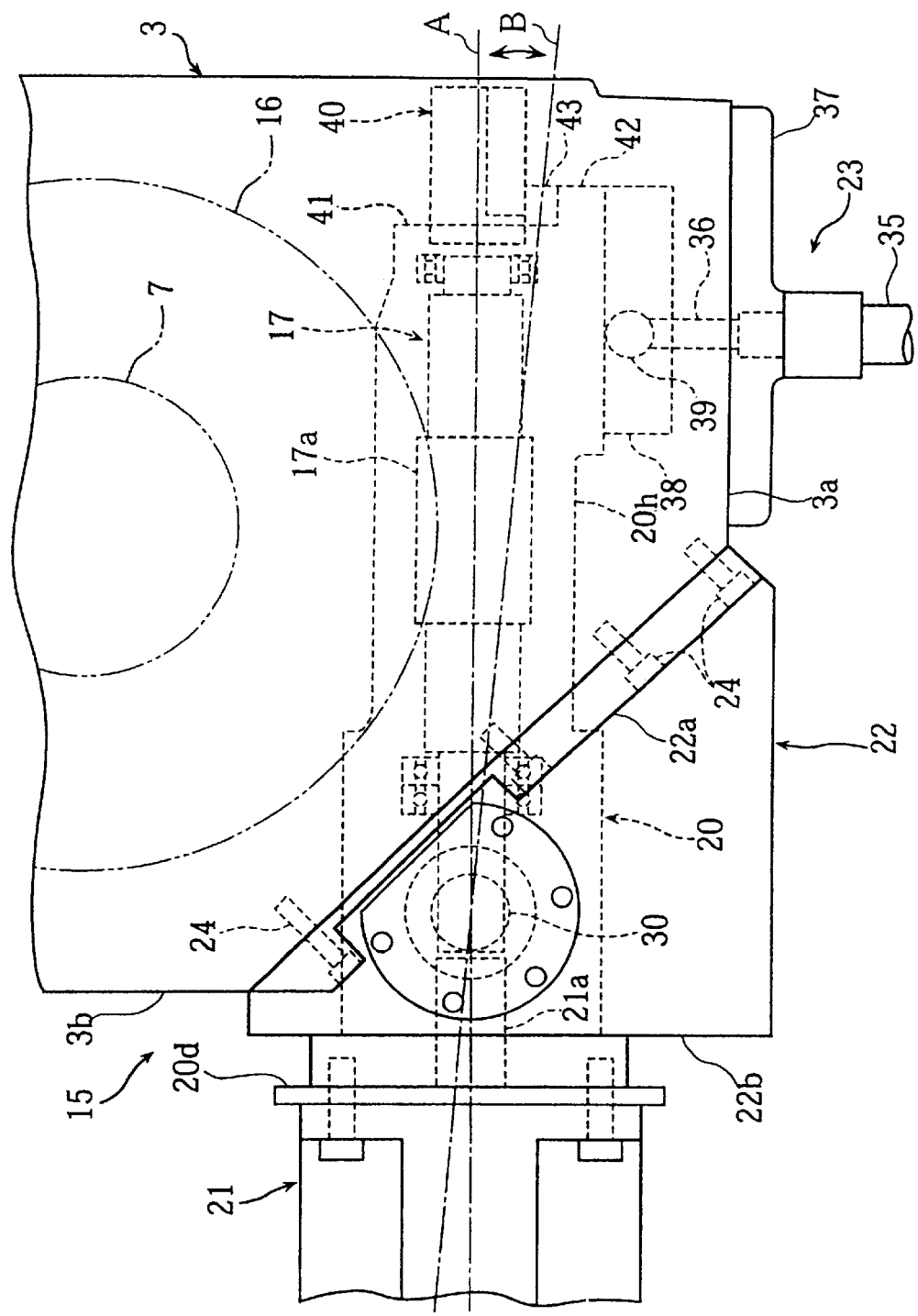
FIG. 3 is a plan view of the C-axis driving system according to the present invention.

Hereinbelow, embodiments of the present invention are described with reference to the accompanying drawings.

Referring to the figures, a vertical NC lathe 1 includes a headstock 3 fixedly mounted on a fixed bed 2 and a saddle 4 is provided above the headstock 3 on a column 2a so as to be movable in the X-axis direction (horizontal direction). Further, a tool post 5 is provided on the saddle 4 so as to be movable in the Z-axis direction (vertical direction). A turret head 6 with turning tools, rotating tools or other cutting tools (not shown) loaded thereon is provided on the tool post 5 so that a required cutting tool can be rotationally indexed to a machining position.

The headstock 3 is rectangular-parallelopiped box shaped, and a spindle 7 is inserted in the headstock 3 so as to be rotatable via bearings 8. The spindle 7 is positioned so that its axis is directed vertically (along the Z-axis). A chuck 9 for gripping a workpiece W is mounted at an upper end portion of the spindle 7, while a hydraulic cylinder mechanism 10 for driving the opening/closing of a gripping claw 9a of the chuck 9 is connected to a lower end portion of the spindle 7.

In the headstock 3, a spindle driving shaft 11 is inserted parallel to the spindle 7 so as to be rotatable via bearings 12. The spindle driving shaft 11 is linked with a driving gear 13 fixedly mounted on the spindle 7 via an unshown power transmission member. A pulley 11a is mounted at a lower end of the spindle driving shaft 11, and an unshown spindle driving motor is linked with the pulley 11a via a belt. By this spindle driving motor, the spindle 7 is driven into rotation via the spindle driving shaft 11, while the turret head 6 moves in the X- and Z-axis directions relative thereto so that a required turning tool cuts into the workpiece W. Thus, the specified turning work is performed.

The headstock 3 is also provided with a C-axis driving system 15. This C-axis driving system 15 is equipped with a worm wheel 16 mounted on the spindle 7 below the driving gear 13, a worm shaft 17 engageable with the worm wheel 16, and a C-axis unit 18 which drives the worm shaft 17 into rotation between an engagement position A where the worm shaft 17 engages with the worm wheel 16 and a disengagement position B where the worm shaft 17 is disengaged therefrom and withdrawn.

The worm wheel 16, which is annularly shaped, is mounted and fixedly bolted on an outer peripheral portion of a disc member 19 fixedly mounted on the spindle 7. The worm shaft 17 is positioned on the front side of the spindle 7 and is perpendicular to the spindle axis (it extends along the X axis). A worm 17a is formed at an axially central portion of the worm shaft 17.

The C-axis unit 18 is made up of a worm shaft base 20 for housing the worm shaft 17, a C-axis driving motor 21 for driving the worm shaft 17 into rotation, a C-axis base 22 for swingably supporting the worm shaft base 20, and a C-axis coupling hydraulic cylinder mechanism 23 for driving the worm shaft base 20 into rotation.

At a corner portion defined by a front wall 3a and a left-side wall 3b of the headstock 3, an opening 3c is formed by cutting out a portion. The C-axis base 22 is placed at this opening 3c. This C-axis base 22 is generally triangularly shaped as seen in a plan view along the cutout portion of the headstock 3. This substantially prevents the headstock 3 from increasing in size due to the installation of the C-axis base 22.

A flange 22a is formed at a peripheral portion of the C-axis base 22. The flange 22a is fixedly attached to an edge portion of the opening 3c with bolts 24. A rectangular hole 22c is formed in a left side wall 22b of the C-axis base 22. The hole 22c has a size that allows the worm shaft base 20 to be passed therethrough.

The worm shaft base 20 is rectangularly shaped with both ends opened and extends so as to be inserted through the rectangular hole 22c of the C-axis base 22 and the opening 3c of the headstock 3 so as to be disposed adjacent to the worm wheel 16. The worm shaft 17 is inserted into the worm shaft base 20, and is supported so as to be rotatable via bearings 25 mounted on both end portions of the worm shaft 17. Also, a window 20b is provided that has a size that allows a front end portion of the worm wheel 16 to be inserted therein and formed as a cutout in a rear side wall 20a of the worm shaft base 20.

An outer end portion of the worm shaft base 20 protrudes outwardly from the C-axis base 22. A flange 20d is formed at an outer end edge of the protruding portion and the C-axis driving motor 21 is fixedly bolted to this flange 20d. A rotating shaft 21a of the C-axis driving motor 21 extends into the worm shaft base 20 so as to be coaxially opposed to the worm shaft 17, and this rotating shaft 21a and the worm shaft 17 are fixedly connected to each other in series by a coupling member 27 (see FIG. 5). Also, an expandable/contractible seal cover 28 (see FIG. 4) is provided so as to cover between the flange 20d of the worm shaft base 20 and the C-axis base 22, thereby preventing dust or the like on the outside from invading into the headstock 3.

Pivotal shafts 30 are provided on the worm shaft base 20 so as to be coaxial with each other. Each pivotal shaft 30 is positioned so that its pivotal axis is directed in the vertical direction (Z-axis direction), which is perpendicular to the axis of the worm shaft 17. The pivotal shafts 30 are respectively fixedly tightened by a plurality of bolts 31 to an upper wall 20e and a lower wall 20f of the worm shaft base 20 in proximity to the C-axis driving motor 21.

The respective pivotal shaft 30 is inserted through a respective insertion hole 22g formed in a top wall 22e and a bottom wall 22f of the C-axis base 22 so as to protrude outwardly a small amount. The respective pivotal shafts are rotatably supported by bearings 32 fixedly mounted on an inner circumferential surface of the insertion hole 22g. The protruding portions of the pivotal shafts 30 are covered with caps 34, respectively. The caps 34 are fixedly bolted to the C-axis base 22. In this way, the worm shaft base 20 is supported by the C-axis base 22 so as to be rotatable back and forth about the pivotal shafts 30.

An opening 3e is formed as a cutout at a portion of the front wall 3a of the headstock 3 adjacent to an inner end portion of the worm shaft base 20. The C-axis coupling hydraulic cylinder mechanism 23 is inserted in the opening 3e. This hydraulic cylinder mechanism 23 has a rough structure that allows a piston rod 36 to be advanceably and retreatably inserted in a cylinder 35. The hydraulic cylinder mechanism 23 is also installed on a plate 37 that is fixedly bolted to the front wall 3a so as to close the opening 3e.

A rectangular-plate shaped coupling block 38 is fixedly bolted to the inner end portion of the worm shaft base 20. In this coupling block 38, a recessed portion 38a having a U-shaped cross section is formed in the rear side wall and a rectangular window 38b communicating with the recessed portion 38a is formed at a central portion of the front wall. An end portion 36a of the piston rod 36 is inserted into the rectangular window 38b. In a front right end face of the coupling block 38, is formed a tapered stopper portion 38c which makes surface-contact with the rear end face of the plate 37 when in the disengagement position B, so that the worm shaft base 20 is restricted in the disengagement position B by this stopper portion 38c (see FIG. 4).

A columnar coupling pin 39 is inserted in the recessed portion 38a so that its axis is vertical. A cutout portion 39a is formed at an axially central portion of this coupling pin 39. The end portion 36a of the piston rod 36 is fixedly screwed to the cutout portion 39a. This coupling pin 39 functions to absorb the rotational motion of the worm shaft base 20 due to the advancing and retreating action of the piston rod 36.

A positioning guide block 40 is provided at a portion within the headstock 3 adjacent the inner end face of the worm shaft base 20. The positioning guide block 40 is fixedly bolted to the headstock 3. This positioning guide block 40 is L-shaped in a right-hand side view. Also it has a rearwardly extending guide portion 40b integrally formed at the lower end of a vertically extending positioning portion 40a. A guide groove 40c extends back-and-forth and is formed in the left-hand side wall of the guide portion 40b.

A guide portion 41 slidably engages the guide groove 40c and is integrally formed with an inner end portion of the lower wall 20f of the worm shaft base 20. As a result of this, the worm shaft base 20 is allowed to rotate only back-and-forth while being prohibited from swinging up-and-down. Thus the worm shaft base 20 is prevented from shifting during rotation.

A positioning portion 42 adjacent to the front face of the positioning portion 40a is integrally formed with an inner end portion of a front wall 20h of the worm shaft base 20. Also, a contact block 43 is fixedly bolted to the positioning portion 42. The contact block 43 positions the worm shaft base 20 to the engagement position A when making contact with the positioning portion 40a. As a result of this arrangement, the pressing force of the piston rod 36 in the hydraulic cylinder mechanism 23 is prevented from acting on the engagement portion of the worm 17a and the worm wheel 16.

Figure 4:
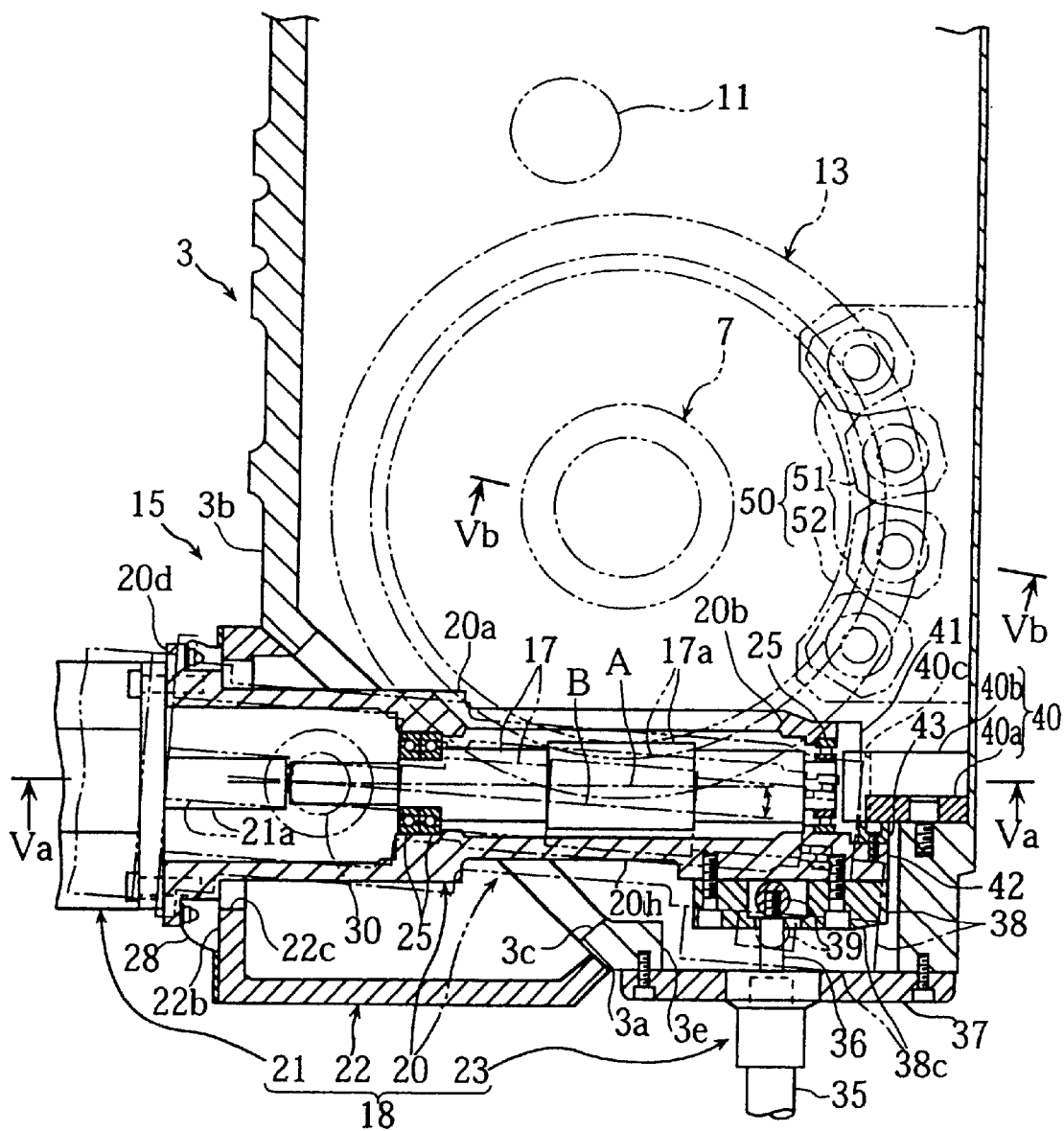
FIG. 4 is a cross-sectional plan view of the C-axis driving system taken along line IV—IV in FIG. 5.
Figure 5:
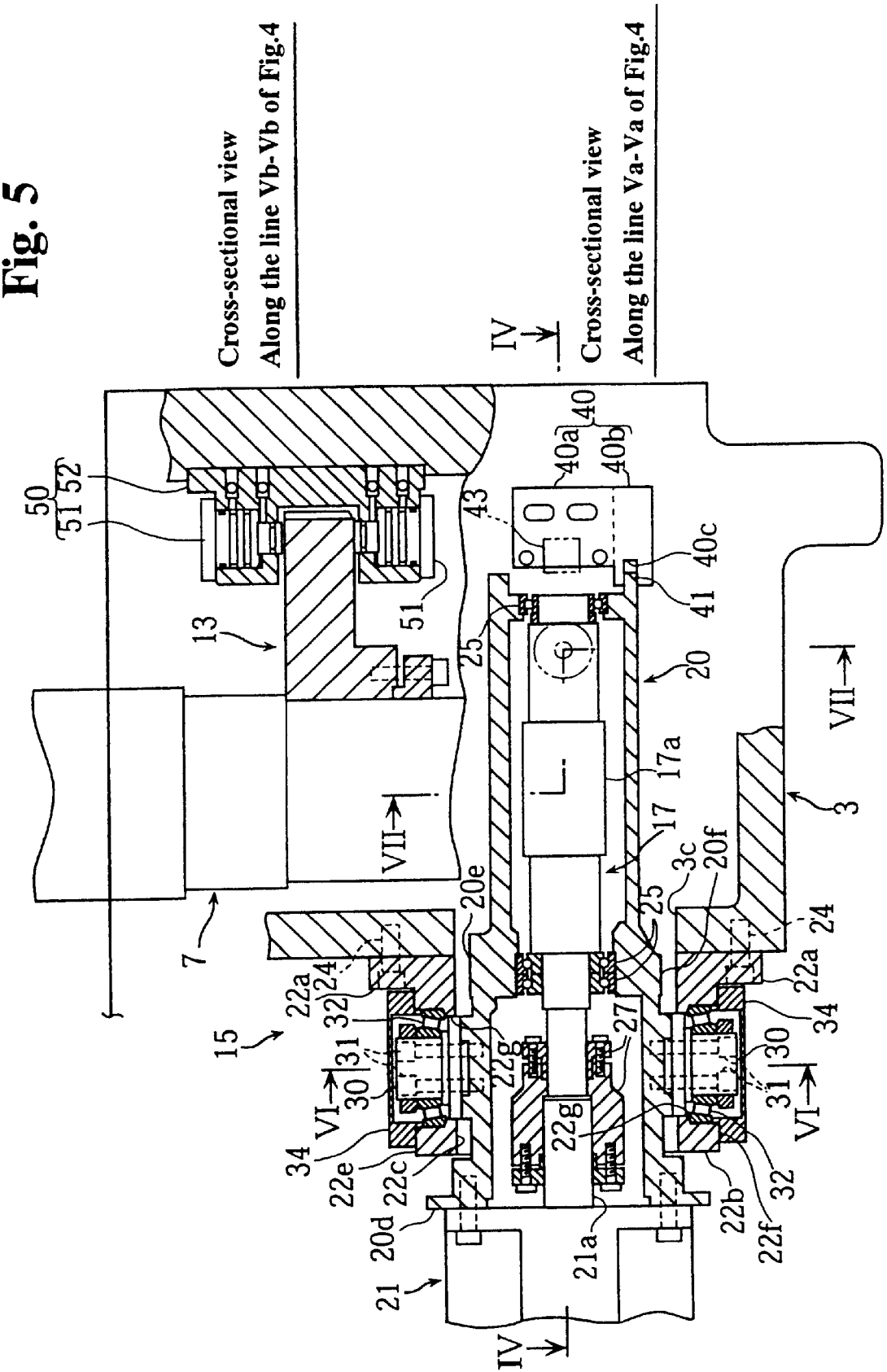
FIG. 5 is a cross-sectional front view of the C-axis driving system taken along lines Va—Va and Vb—Vb in FIG. 4.
Figure 6:
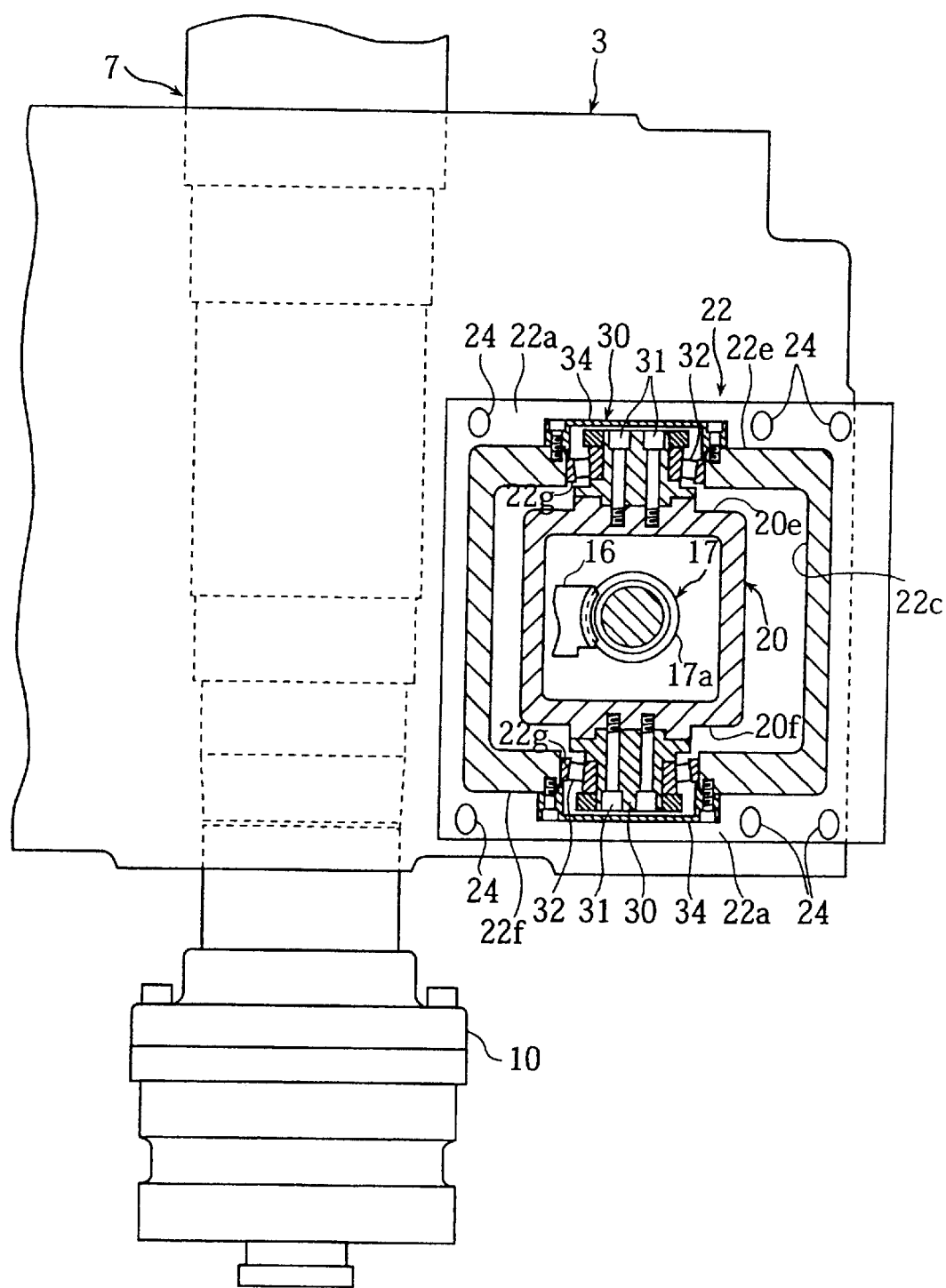
FIG. 6 is a cross-sectional side view of the pivotal shaft part of the C-axis driving system taken along line VI—VI in FIG. 5.
Figure 7:
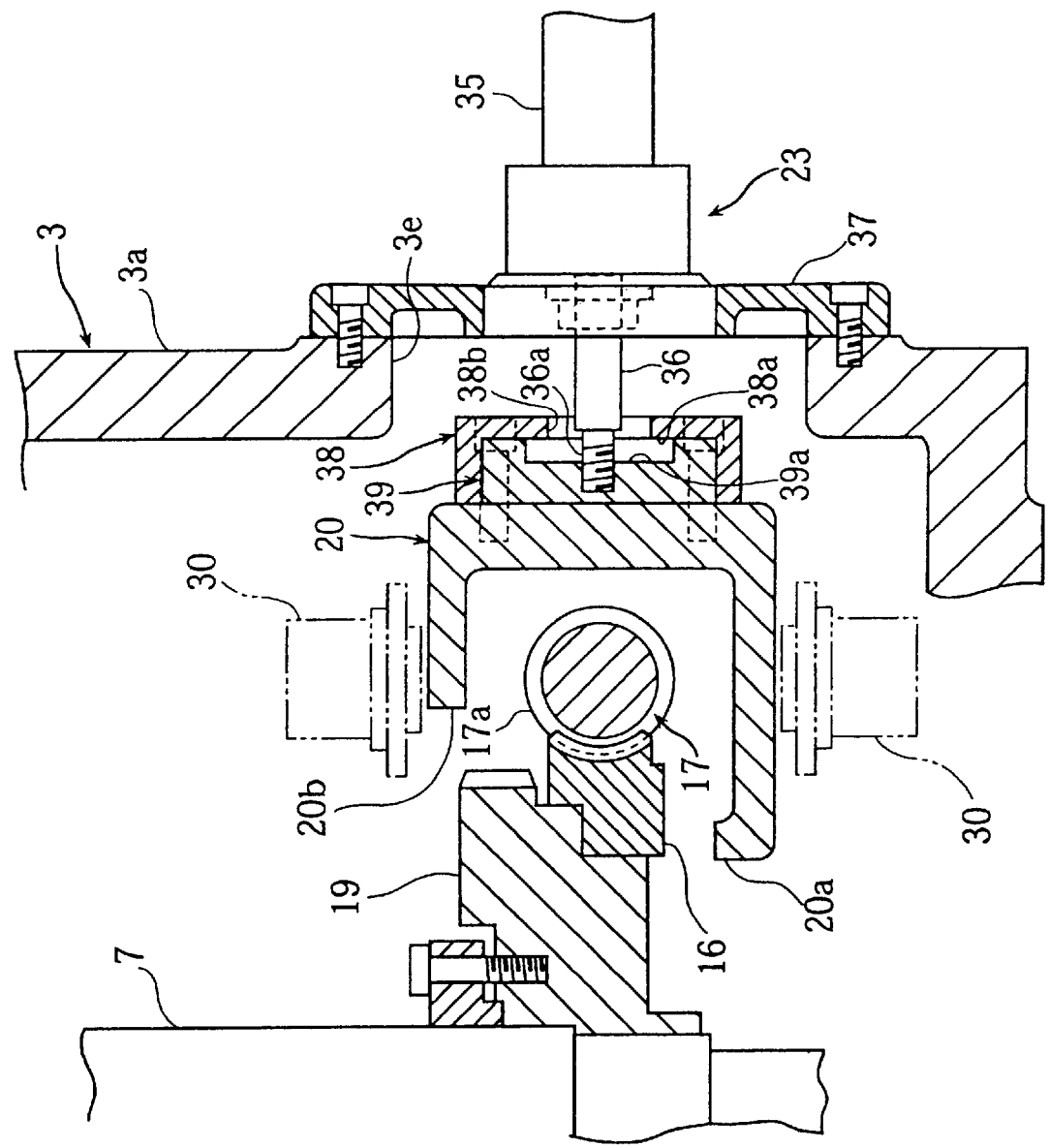
FIG. 7 is a cross-sectional side view of the engagement part between the worm wheel and the worm shaft of the C-axis driving system taken along line VII—VII in FIG. 5.
Figure 8:
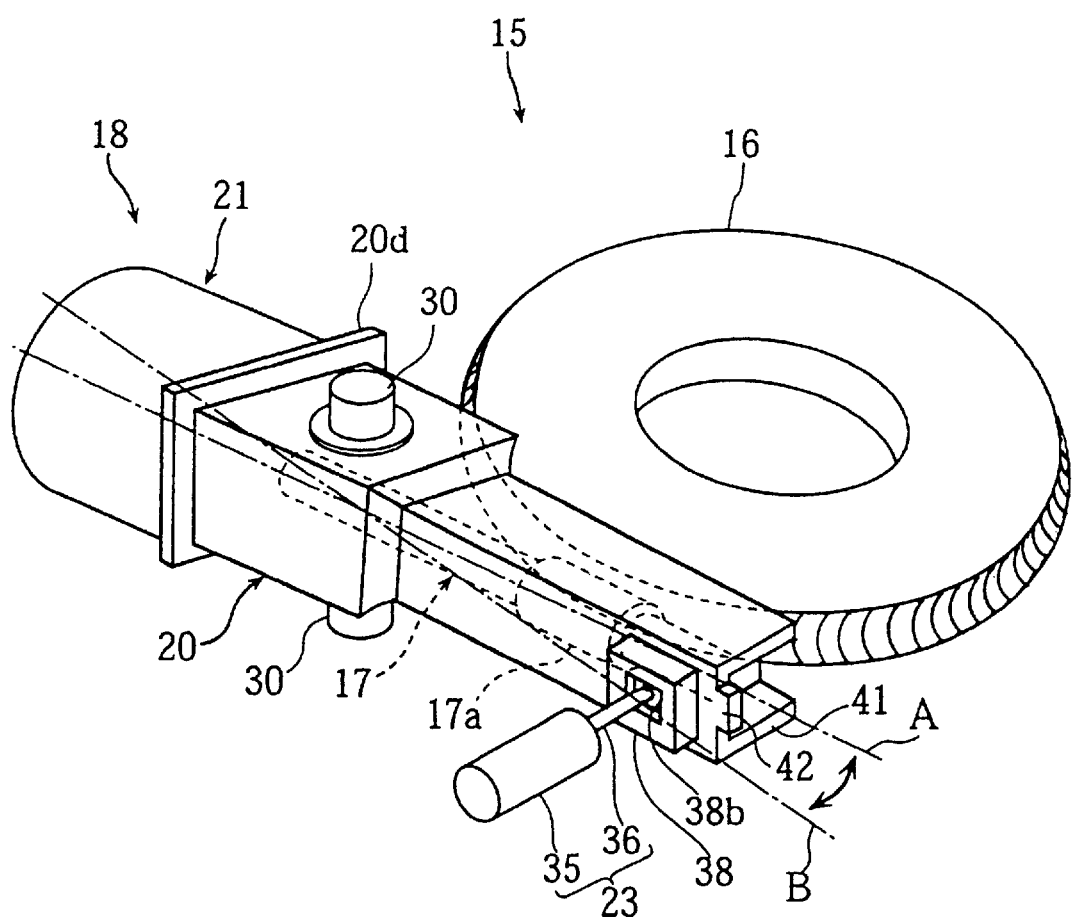
FIG. 8 is a schematic perspective view of the C-axis driving system according to the present invention.
Figure 9:
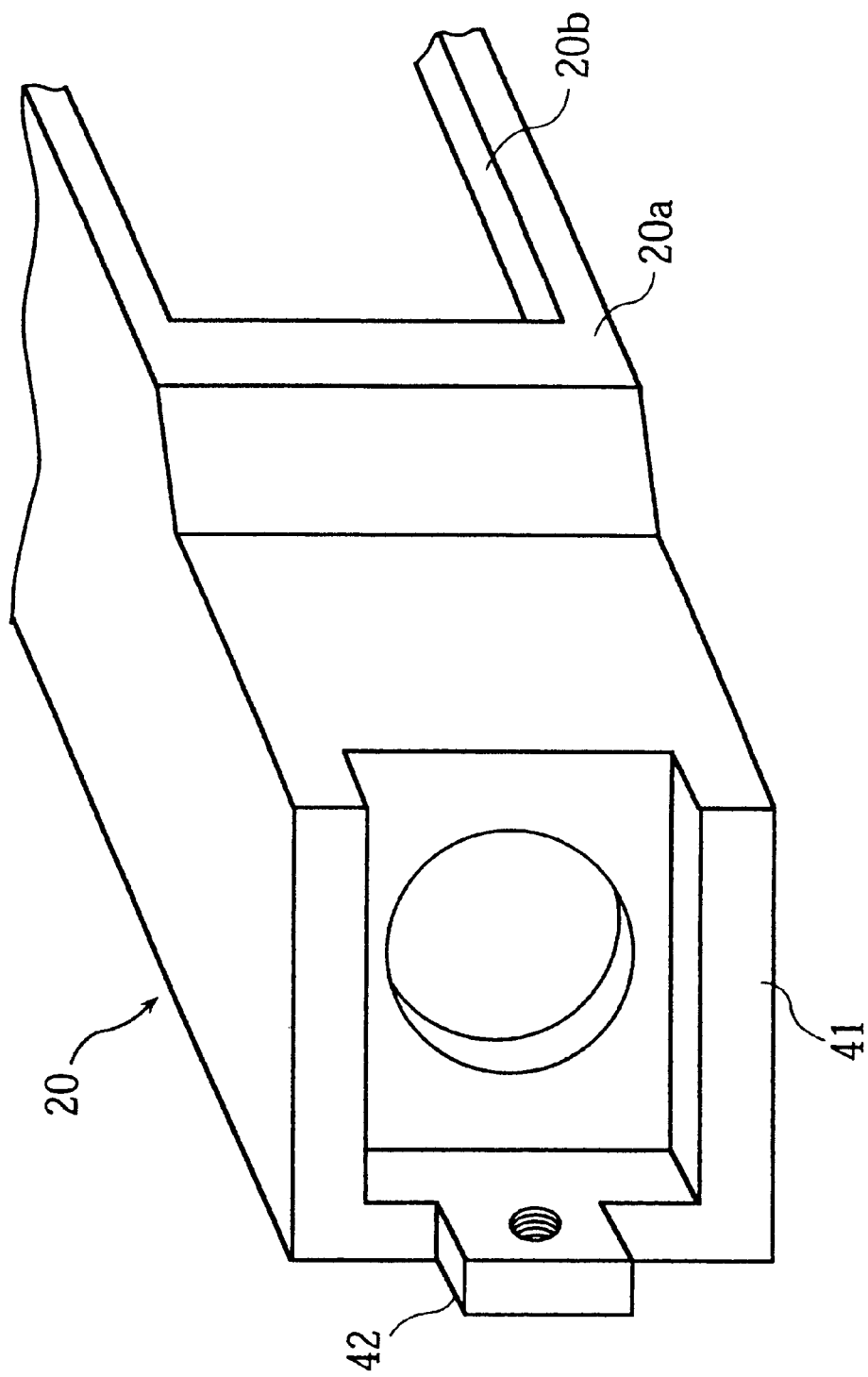
FIG. 9 is a perspective view of the worm shaft base of the C-axis driving system according to the present invention.
Figure 10:
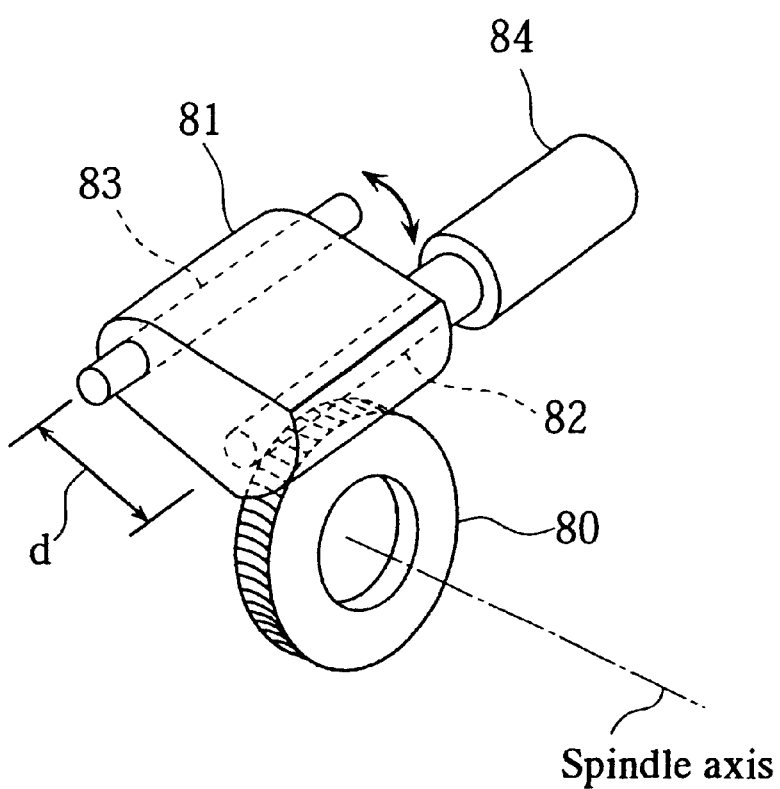
FIG. 10 is a schematic view of a C-axis driving unit according to the prior art.

The spindle 7 is also equipped with a hydraulic clamp mechanism 50 for fixing the spindle 7 in a rotational index position, as shown in FIGS. 4 and 5. This hydraulic clamp mechanism 50 has four pairs of pistons 51 disposed circumferentially. Each pair of pistons 51 being opposed to each other with the driving gear 13 interposed therebetween. Each piston 51 is inserted in a common cylinder block 52. Each piston 51 can be driven to advance and retreat between a clamped position, where the driving gear 13 is fixedly clamped by hydraulic pressure, and an unclamped position, where the driving gear 13 is not clamped. It is noted that in FIG. 5 both the clamped position and the unclamped position are shown. Specifically, the upper piston 51 shows the unclamped state while the lower piston 51 shows the clamped state.

Next, the functional effects of this embodiment are described.

When a lathe machining operation is performed with the vertical NC lathe 1 of this embodiment, the worm shaft base 20 is moved to the disengagement position B and the piston 51 of the hydraulic clamp mechanism 50 is moved to the unclamped position. In this state, the spindle 7 is driven into rotation by the spindle driving motor, and the turning tool indexed to the machining position by the turret head 6 cuts into the workpiece W.

When a rotating tool machining operation is performed, the spindle 7 is prevented from rotating, then the piston rod 36 of the hydraulic cylinder mechanism 23 is advanced and the worm shaft base 20 is pivoted until the contact block 43 makes contact with the positioning guide block 40. As a result, the worm shaft base 20 is fixedly positioned in the engagement position A where the worm 17a engages with the worm wheel 16. In this case, the contact block 43 is in contact with the guide block 40, thereby blocking the worm shaft base 20 from pivoting toward engagement. Thus, the hydraulic pressure of the hydraulic cylinder mechanism 23 never acts on the worm wheel 16. Further, since the worm shaft base 20 is guided by the guide groove 40c of the guide block 40, the worm shaft base 20 is allowed to smoothly pivot without occurrence of up-and-down shifts.

At the engagement position A, the C-axis driving motor 21 drives the worm shaft 17 into rotation so that the spindle 7 is rotationally indexed to a specified rotational angle. At this index position, the pistons 51 of the hydraulic clamp mechanism 50 clamp the driving gear 13 so as to fix the spindle 7. Subsequently, the tool post 5 turns the turret head 6 to rotationally index a required rotating tool to a machining position so that the workpiece W is subjected to rotating work such as milling or drilling with the rotating tool.

According to this embodiment, the worm shaft 17 is placed and housed within the rectangular shaped worm shaft base 20, while the pivotal shaft 30 is placed on the upper wall 20e and the lower wall 20f of the worm shaft base 20 so as to be directed along the vertical direction, which is perpendicular to the axis of the worm shaft 17. Further the C-axis base 22 rotatably supports the pivotal shaft 30. Therefore, the worm shaft base 20 can be set to a size so that the worm shaft 17 can be housed therein. This allows the worm shaft base 20 to be smaller in size when compared to the conventional case where the worm shaft and the pivotal shaft are housed in a unit casing with a distance therebetween. This in turn allows the C-axis unit 18 as a whole to be reduced in size. Also, since the pivotal shaft 30 is placed perpendicular to the worm shaft 17, the axial length of the pivotal shaft 30 can be reduced compared with the conventional case where the pivotal shaft is equal in length with the worm shaft. From this point as well, the C-axis unit 18 can be reduced in size.

Further, since the worm shaft base 20 can be reduced in size, the structure can be simplified when compared with the conventional case where a large size unit casing is provided. As a result, the number of parts can be reduced as well as the cost.

In this embodiment, since the pivotal shaft 30 is placed in proximity to the C-axis driving motor 21 at the outer end portion of the worm shaft base 20, the rotational angle of the worm shaft base 20 can be reduced by setting a large distance between the worm 17a and the pivotal shaft 30. As a result, a smooth engagement with the worm wheel 16 can be achieved.

Furthermore, the C-axis driving motor 21 is connected in series with the outer end of the worm shaft base 20. Also, the hydraulic cylinder mechanism 23 is connected to the inner end portion of the worm shaft base 20. Thus, the pivotal operation force of the worm shaft base 20 can be reduced, allowing the hydraulic cylinder mechanism 23 to be reduced in size when compared with the conventional case where the whole unit including the C-axis driving motor is pivoted. From this point as well, the whole unit can be decreased in size.

The above embodiment has been described for the case where the invention is applied to a vertical NC lathe where the spindle axis is vertical. However, the machine tool according to the present invention is applicable also to lathes where the spindle axis is horizontally oriented as well as to any machine tools capable of C-axis machining.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2000-156815 filed May 26, 2000 is hereby incorporated by reference.

What is claimed is:

1. A C-axis driving system for machine tools, comprising:

a worm wheel engageable with a spindle rotatably supported by a headstock, the headstock having an opening formed in a corner portion of the headstock, a worm shaft with a worm formed therein, the worm shaft being oriented perpendicular to an axis of the spindle and provided so as to be pivotable about a pivotal shaft between an engagement position where the worm shaft is engaged with the worm wheel and a disengagement position where the worm shaft is disengaged therefrom, and a C-axis driving motor connected to the worm shaft and serving for rotationally indexing the spindle to a specified rotational angle, and a C-axis base being attached adjacent to the opening in the headstock, and a portion of the C-axis base includes a triangular cross section, wherein the worm shaft is rotatably supported by a worm shaft base and the pivotal shaft is oriented relative to the worm shaft base so as to be directed perpendicular to an axis of the worm shaft, and the worm shaft base being pivotally supported by the C-axis base.

\* \* \* \* \*